3,377,393
1,1,1,2,2-PENTAFLUORO-3-CHLORO-3,3-DIBROMOPROPANE
Harry Louis Yale, New Brunswick, N.J., assignor to E. R. Squibb & Sons, Inc., New York, N.Y., a corporation of Delaware
No Drawing. Filed Apr. 21, 1966, Ser. No. 544,086
3 Claims. (Cl. 260—653)

ABSTRACT OF THE DISCLOSURE 1,1,1,2,2,-pentafluoro-3-bromo-3-chloropropane is prepared by reducing 1,1,1,2,2-pentafluoro-3-chloro-3,3-dibromopropane. The latter is a new compound prepared by either brominating 1,1,1,2,2-pentafluoro-3-chloropropane or chlorinating 1,1,1,2,2-pentafluoro-3,3-dibromopropane. The latter is also a new compound which is prepared by brominating 1,1,1,2,2-pentafluoropropane.

---

This invention relates to a new chemical process and more particularly to a new process for preparing 1,1,1,2,2-pentafluoro-3-bromo-3-chloropropane, $$CF_3CF_2CHBrCl$$

a compound having inhalation anesthetic activity, as more fully described in my application, Ser. No. 365,173, filed May 5, 1964, now abandoned and to certain new intermediates useful in such process.

In accordance with the present invention, $$CF_3CF_2CHBrCl$$

is prepared by reducing a new compound of this invention, 1,1,1,2,2-pentafluoro-3-chloro-3,3-dibromopropane, having the formula $CF_3CF_2CBr_2Cl$. This new compound in turn can be prepared by either brominating 1,1,1,2,2-pentafluoro-3-chloropropane or by chlorinating another new compound of this invention 1,1,1,2,2-pentafluoro-3,3-dibromopropane, having the formula $CF_3CF_2CHBr_2$, which in turn is prepared by brominating 1,1,1,2,2-pentafluoropropane, all as more fully described hereinafter.

In addition to its use as an intermediate, 1,1,1,2,2-pentafluoro-3,3-dibromopropane has anesthetic activity and hence can be used as an inhalation anesthetic to induce anesthesia in warm blooded animals, such as mammals (e.g., cats and dogs), for which purpose it is administered with a source of oxygen (e.g., air) at a concentration of about 0.4 to about 10 percent (vol./vol.).

Two methods are available to prepare the new $CF_3CF_2CBr_2Cl$ intermediate of this invention. In one method, $CF_3CF_2CH_3$ is brominated to yield a mixture of $CF_3CF_2CH_2Br$ and $CF_3CF_2CHBr_2$, a new intermediate of this invention. The mixture may then be separated, as by fractional distillation, to yield the desired $CF_3CF_2CHBr_2$ fraction; or the mixture itself used in the next step which involves chlorination to yield a mixture of the desired final product $CF_3CF_2CHBrCl$ and the new intermediate of this invention, $CF_3CF_2CBr_2Cl$, if the mixture is chlorinated, or the new intermediate alone, if the mixture has been fractionated prior to chlorination. The resulting mixture containing desired final product and the new intermediate can then be separated, as by fractional distillation to remove the final product, prior to reduction of the new intermediate to yield the desired final product, as more fully detailed hereinafter.

In the second method, $CF_3CF_2CH_2Cl$ is brominated to yield a mixture of the desired final product $$CF_3CF_2CHBrCl$$

and the new intermediate of this invention, $$CF_3CF_2CBr_2Cl$$

and the resulting mixture separated and the intermediate reduced, as more fully described hereinafter.

The necessary chlorination and bromination steps can be conducted in a number of ways. By one method a thermal reaction is used, the process being preferably carried out at a temperature range of about 100° C. to about 500° C. and optimally about 250° C. to about 500° C. Under these conditions a reaction time of about 0.25 second to about 40 seconds has been found to be sufficient to yield the desired product.

The process may also be carried out by using a source of ultraviolet light. This light is preferably in the range of about 2,000 to about 7,500 angstrom units, and optimally in the range of about 2,000 to about 5,000 angstrom units. Suitable sources include sunlight, ultraviolet light, mercury vapor light and black fluorescent light. The reaction can be conducted at any temperature, such a temperature in the range of about 25° C. to about 250° C.

Finally, the process can also be carried out in the presence of a free radical promoter, such as a peroxide (e.g., di-tert-butylperoxide and dibenzoylperoxide) or an azo compound (e.g., α,α-azodiisobutyronitrile) in which event a temperature of about 25° C. to about 250° C., and optimally about 80° C. to about 150° C. has been found to be utilizable.

In all three processes a stoichiometric amount of halogen (i.e., bromine and chlorine) is used to assure completeness of the desired reactions.

The $CF_3CF_2CBr_2Cl$ formed is then reduced, as by treatment with a sulfite compound under alkaline conditions (e.g., an alkali metal sulfite, such as sodium sulfite, in the presence of an alkali metal hydroxide, such as sodium hydroxide), or by treatment with a hydrosulfite under alkaline conditions (e.g., an alkali metal hydrosulfite, such as sodium hydrosulfite, in the presence of an alkali metal hydroxide, such as sodium hydroxide) to yield the desired final product, $CF_3CF_2CHBrCl$.

The following examples illustrate the invention (all temperatures being in centigrade):

Example 1.—1,1,1,2,2-pentafluoro-3,3-dibromopropane 1,1,1,2,2-Pentafluoropropane and bromine, in a molar ratio of 1:2, are separately metered into a preheater maintained at about 150° and the mixture then allowed to flow through a horizontal reactor heated so as to maintain an internal temperature of about 450–500°. The residence time is about 25 seconds. During eight hours a total of 1.2 and 2.4 moles, respectively, of the reactants are charged. The effluent gases are successively cooled, first with water and then with brine to collect two separate condensates. The first condensate is washed successively with water, aqueous 10% sodium thiosulfate, and water, dried, and fractionated to give first about 19 g. of 1,1,1,2,2-pentafluoro-3-bromopropane, B.P. about 46.5° followed by the major fraction, about 175 g. of 1,1,1,2,2-pentafluoro-3,3-dibromopropane, B.P. about 93°.

The second condensate, about 40 g., consists largely of unreacted 1,1,1,2,2-pentafluoropropane. This, as well as the 1,1,1,2,2-pentafluoro-3-bromopropane are recirculated, with the appropriate amount of bromine, in the same reactor to give additional amounts of 1,1,1,2,2-pentafluoro-3,3-dibromopropane.

Example 2.—1,1,1,2,2-pentafluoro-3-chloro-3,3-dibromopropane 1,1,1,2,2-pentafluoro-3,3-dibromopropane and chlorine, in a molar ratio of 1:0.9, are separately metered into a preheater maintained at about 150° and the mixture then introduced into a vertical glass reactor, 80 × 600 mm. in size, into which is sealed a mercury vapor lamp. The reactor is heated externally and irradiated so as to maintain an internal temperature of 225–250°. The residence time is about 30 seconds and during eight hours, a total of 1.0 and 0.9 mole, respectively, of the reactants are charged. The effluent gases are cooled with water, the liquid condensate is washed and dried, and then fractionated through an efficient column to give first about 58 g. of unreacted 1,1,1,2,2 - pentafluoro-3,3-dibromopropane and then, about 228 g. of 1,1,1,2,2-pentafluoro-3-chloro-3,3-dibromopropane, B.P. about 113°.

Example 3.—1,1,1,2,2-pentafluoro-3-chloro-3,3-dibromopropane 1,1,1,2,2-pentafluoro-3,3-dibromopropane and chlorine, in a molar ratio of 1:0.9, are separately metered into a preheater maintained at about 200° and the mixture then introduced into a horizontal reactor heated so as to maintain an internal temperature of 450°. The residence time is about 25 seconds. During one hour, 0.12 and 0.108 mole, respectively, of the reactants are charged. The effluent gases are condensed and the liquid condensate washed and dried and then fractionated to give about 16.0 g. of 1,1,1,2,2-pentafluoro-3-chloro-3,3-dibromopropane.

Example 4.—1,1,1,2,2-pentafluoro-3-chloropropane 1,1,1,2,2-pentafluoropropane and chlorine, in a molar ratio of 1:0.9, are reacted as in Example 2. Fractionation of the condensate gives a mixture of 1,1,1,2,2-pentafluoro-3-chloropropane and 1,1,1,2,2-pentafluoro-3,3-dichloropropane.

Example 5.—1,1,1,2,2-pentafluoro-3-chloro-3,3-dibromopropane

Into a preheater and reactor maintained as described in Example 1 is introduced a 1:2 molar mixture of 1,1,1,2,2-pentafluoro-3-chloropropane and bromine. The residence time is about 35 seconds. During two hours about 0.3 and 0.6 mole of the reactants, respectively, are charged. The gaseous products are collected, washed and distilled as in Example 1 to give 15 g. of 1,1,1,2,2-pentafluoro-3-bromo-3-chloropropane, B.P. about 70.6° and about 65 g. of 1,1,1,2,2-pentafluoro-3-chloro-3,3-dibromopropane.

Example 6.—1,1,1,2,2-pentafluoro-3-chloro-3,3-dibromopropane

A feed stock is prepared of 1,1,1,2,2-pentafluoro-3,3-dibromopropane containing about 0.01% of di-tert-butylperoxide. This solution and chlorine, in a molar ratio of 1:0.9, are separately metered into a preheater at 125° and the vapors allowed to pass into a vertical glass reactor, 80 × 600 mm. in size, into which is sealed a mercury vapor lamp. The reactor is heated externally and irradiated so as to maintain an internal temperature of about 175–190°. The residence time is about 30 seconds. During eight hours, a total of about 1.0 and 0.9 mole, respectively, of the reactants are charged. From the effluent gases is recovered about 216 g. of 1,1,1,2,2-pentafluoro-3-chloro-3,3-dibromopropane.

Example 7.—1,1,1,2,2-pentafluoro-3-chloro-3,3-dibromopropane

The procedure of Example 6 is followed except that 0.01% dibenzoylperoxide is used in place of the di-tert-butylperoxide.

Example 8.—1,1,1,2,2-pentafluoro-3-bromo-3-chloropropane

To 650 g. of $CF_3CF_2CBr_2Cl$ is added 200 g. of an aqueous solution containing 14.7% $Na_2SO_3$ and 6.3% NaOH. The mixture is heated to the boiling point. When the temperature of the vapor reaches 65–70°, 1700 g. of the same aqueous solution (14.7% $Na_2SO_3$ and 6.3% NaOH) is added dropwise while product is collected, B.P. 65–72°. When the addition is completed, the total distillate is dried and redistilled through an efficient column to give 393 g. of pure $CF_3CF_2CHBrCl$, B.P. 70.6° (760 mm.) and 24.8 g. of $CF_3CF_2CBr_2Cl$; the latter can be recycled to produce additional $CF_3CF_2CHBrCl$.

Example 9.—1,1,1,2,2-pentafluoro-3-chloro-3,3-dibromopropane

The procedure of Example 6 is followed except that 0.1% α,α-azodiisobutyronitrile is used in place of the di-tert-butylperoxide.

Example 10.—1,1,1,2,2-pentafluoro-3-bromo-3-chloropropane

The procedure of Example 8 is followed except that 200 g. of an aqueous solution containing 20.3% $Na_2S_2O_4$ and 6.3% NaOH is used initially, followed by 1700 g. of the same solution (20.3% $Na_2S_2O_4$ and 6.3% NaOH), added dropwise, while the 1,1,1,2,2-pentafluoro-3-bromo-3-chloropropane is collected, B.P. 70.6° (760 mm.).

The invention may be variously otherwise embodied within the scope of the appended claims.

What is claimed is:
1. 1,1,1,2,2-pentafluoro-3-chloro-3,3-dibromopropane.
2. 1,1,1,2,2-pentafluoro-3,3-dibromopropane.
3. A process for preparing 1,1,1,2,2-pentafluoro-3,3-dibromopropane, which comprises treating 1,1,1,2,2-pentafluoropropane with bromine either at a temperature in the range of about 100° C. to about 500° C., or in the presence of a source of ultraviolet light, or in the presence of a free radical promoter.

References Cited

UNITED STATES PATENTS

| | | | |
|---|---|---|---|
| 2,490,764 | 12/1949 | Benning et al. | 260—653 |
| 2,921,098 | 1/1960 | Suckling et al. | 260—653 |
| 3,177,260 | 4/1965 | Muray et al. | 260—653 |

FOREIGN PATENTS

| | | |
|---|---|---|
| 939,920 | 10/1963 | Great Britain. |

OTHER REFERENCES

Knunyants et al., Chemical Abstracts 58, 4407f (1963).
Coscia, Chemical Abstracts 56, 302a (1962).

DANIEL D. HORWITZ, *Primary Examiner.*